(12) United States Patent
Mellet et al.

(10) Patent No.: US 8,474,341 B2
(45) Date of Patent: Jul. 2, 2013

(54) DUAL CLUTCH TRANSMISSION

(75) Inventors: Edward W. Mellet, Rochester Hills, MI (US); Scott H. Wittkopp, Ypsilanti, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 13/206,956

(22) Filed: Aug. 10, 2011

(65) Prior Publication Data

US 2011/0290073 A1 Dec. 1, 2011

Related U.S. Application Data

(63) Continuation-in-part of application No. 12/718,235, filed on Mar. 5, 2010, now Pat. No. 8,327,730.

(51) Int. Cl.
*F16H 3/08* (2006.01)

(52) U.S. Cl.
USPC .......................................................... 74/330

(58) Field of Classification Search
USPC .................... 74/330, 331, 333, 340
See application file for complete search history.

(56) References Cited

U.S. PATENT DOCUMENTS

| | | |
|---|---|---|
| 6,427,547 B1 | 8/2002 | Bowen |
| 6,427,549 B1 | 8/2002 | Bowen |
| 6,427,550 B1 | 8/2002 | Bowen |
| 6,499,370 B2 | 12/2002 | Bowen |
| 6,973,849 B2 | 12/2005 | Hosono |
| 7,004,044 B2 | 2/2006 | Hosono |
| 7,272,986 B2 | 9/2007 | Janson |
| 7,464,616 B2 | 12/2008 | Leibbrandt et al. |
| 7,610,825 B2 * | 11/2009 | Hendrickson et al. ......... 74/330 |
| 2002/0189383 A1 | 12/2002 | Schamscha |
| 2005/0150318 A1 | 7/2005 | Baldascini et al. |
| 2005/0204839 A1 | 9/2005 | Soeda |
| 2005/0204840 A1 | 9/2005 | Soeda |
| 2005/0262956 A1 | 12/2005 | Janson et al. |
| 2006/0037422 A1 | 2/2006 | Kuhstrebe et al. |
| 2006/0266141 A1 * | 11/2006 | Ogami ........................... 74/325 |
| 2007/0227285 A1 | 10/2007 | Drabek |
| 2008/0134820 A1 * | 6/2008 | Bjorck et al. .................. 74/331 |
| 2008/0202266 A1 * | 8/2008 | Hendrickson et al. ......... 74/331 |
| 2010/0255949 A1 | 10/2010 | Mellet et al. |

FOREIGN PATENT DOCUMENTS

| | | |
|---|---|---|
| DE | 102005057802 A1 | 6/2007 |
| EP | 1077336 A1 | 2/2001 |
| EP | 1400731 A2 | 3/2004 |
| WO | WO2006040150 A1 | 4/2006 |

* cited by examiner

*Primary Examiner* — Ha D Ho

(57) ABSTRACT

A transmission includes an input member, an output member, first and second shafts, first and second countershafts, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

14 Claims, 2 Drawing Sheets

DUAL CLUTCH TRANSMISSION

CROSS-REFERENCE TO RELATED APPLICATIONS

This application is a continuation-in-part of U.S. patent application Ser. No. 12/718,235, filed on Mar. 5, 2010, thus, under 35 U.S.C. 120 claims the benefit of the earlier filing date of same.

TECHNICAL FIELD

The present disclosure relates to transmissions and more particularly to a compact, dual clutch transmission having three axes to establish six gear speeds of which one is a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second transmission input shaft members, first and second countershafts, a plurality of co-planar gear sets and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes six co-planar gear sets.

In yet another aspect of the present invention, the transmission includes three synchronizer assemblies.

In yet another aspect of the present invention, the three synchronizer assemblies are each two-way synchronizers.

In yet another aspect of the present invention, the transmission is operable to provide at least five forward speed ratios.

In still another aspect of the present invention, a dual clutch transmission having a transmission housing, six gear sets, a first and second transmission input member, a dual clutch assembly, a first and second countershaft and three synchronizer assemblies is provided.

In still another aspect of the present invention, the first gear set includes a first gear in mesh with a second gear. The second gear set includes a first gear in mesh with a second gear. The third gear set includes a first gear in mesh with a second gear and the second gear in mesh with a third gear. The fourth gear set includes a first gear in mesh with a second gear. The fifth gear set includes a first gear in mesh with a second gear. The sixth gear set includes a first gear in mesh with a second gear.

In still another aspect of the present invention, the first transmission input shaft member is rotatably supported in the transmission housing. Each of the first gears of the fourth, fifth and sixth gear sets are rotatably fixed for common rotation with the first transmission input shaft member.

In still another aspect of the present invention, the second transmission input shaft member is rotatably supported in the transmission housing. Each of the first gears of the first, second and third gear sets are rotatably fixed for common rotation with the second transmission input shaft member. The second transmission input shaft member is concentric with the first transmission input shaft member and at least partially surrounds the first transmission input shaft member.

In still another aspect of the present invention, the dual clutch assembly has a clutch housing connectable to a flywheel of an engine, a first clutch configured to selectively connect the clutch housing to the first transmission input shaft member and a second clutch configured to selectively connect the clutch housing to the second transmission input shaft member. The clutch housing is rotationally supported within the transmission housing.

In still another aspect of the present invention, the first countershaft is rotatably supported within the transmission housing and spaced apart from and parallel with the first and second transmission input members. The third gear of the third gear set and second gears of the fourth gear set, the fifth gear set and the sixth gear set are each selectively connectable for common rotation with the first countershaft and the third gear of the first gear set is supported on and rotatable about the first countershaft.

In still another aspect of the present invention, the second countershaft is rotatably supported within the transmission housing and spaced apart from and parallel with the first and second transmission input members. The second gears of the first gear set, the second gear set and the third gear set are each selectively connectable for common rotation with the second countershaft.

In still another aspect of the present invention, the first synchronizer assembly is configured to selectively connect the second gear of the first gear set to the second countershaft to establish a fourth gear ratio and the second gear of the second gear set to the second countershaft to establish a second gear ratio when the second clutch of the dual clutch assembly is engaged to connect the clutch housing of the dual clutch to the second transmission input member.

In still another aspect of the present invention, the second synchronizer is configured to selectively connect the third gear of the third gear set to the first countershaft to establish a reverse gear ratio when the second clutch of the dual clutch assembly is engaged to connect the clutch housing of the dual clutch to the second transmission input member and second gear of the fourth gear set to the first countershaft to establish a third gear ratio when the first clutch of the dual clutch assembly is engaged to connect the clutch housing of the dual clutch to the first transmission input member;

In still another aspect of the present invention, the third synchronizer assembly is configured to selectively connect the second gear of the fifth gear set to the first countershaft to establish a fifth gear ratio and the second gear of the sixth gear set to the first countershaft to establish a first gear ratio when the first clutch of the dual clutch assembly is engaged to connect the clutch housing of the dual clutch to the first transmission input member.

The above features and advantages and other features and advantages of the present invention are readily apparent from the following detailed description of the best modes for carrying out the invention when taken in connection with the accompanying drawings.

DESCRIPTION

Figure 1:
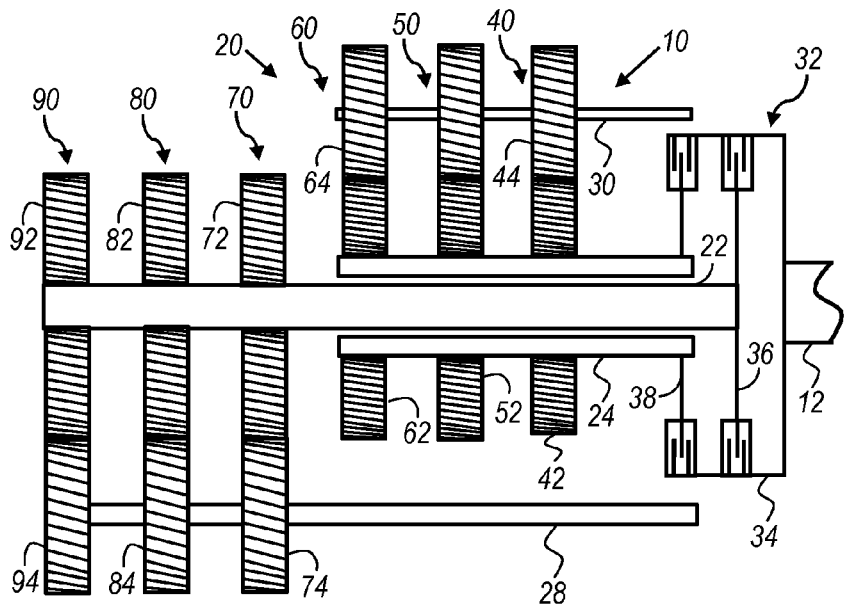
FIG. 1 is a schematic diagram of an embodiment of a five speed transmission, in accordance with the present invention.

Referring to FIG. 1, a multiple speed transmission is generally indicated by reference number 10. The transmission 10 is connectable to an input member 12 and includes a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 28 and a second countershaft 30. The second transmission input shaft or member 24 is a sleeve shaft that is concentric with and overlies the first transmission input shaft or member 22. The first and second countershafts 28, 30 are spaced apart from and parallel with the first and second transmission input shaft members 22, 24. Moreover, the first and second countershafts 28, 30 are connectable through additional gears and/or shafts (not shown) to a final drive assembly (not shown) that is configured to drive a pair of road wheels (not shown). The first and second transmission input shafts 22, 24 define a first axis of rotation, the first countershaft 28 defines a second axis of rotation and the second countershaft 30 defines a third axis of rotation.

A dual clutch assembly 32 is connected between the input member 12 and the first and second transmission input shaft or members 22, 24. The dual clutch assembly 32 includes a clutch housing 34 connectable to the input member 12 for common rotation with the input member 12. The dual clutch assembly 32 could be either a dry or a wet clutch assembly. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24.

The gearing arrangement 20 also includes a plurality of co-planar, intermeshing gear sets 40, 50, 60, 70, 80 and 90. Co-planar gear sets 40, 50, 60, 70, 80 and 90 include intermeshing gear pairs: gear 42 and gear 44, gear 52 and gear 54, gear 62 and gear 64, gear 72 and gear 74, gear 82 and gear 84 and gear 92 and gear 94, respectively. In an embodiment of the present invention, gears 42, 52, 62 are either rotatably fixed for common rotation with the second transmission input shaft member 24 or are selectively connectable for common rotation with the second transmission input shaft member 24. Gears 72, 82, 92 are either rotatably fixed for common rotation with the first transmission input shaft member 22 or are selectively connectable for common rotation with the first transmission input member 22. Gears 44, 54 and 64 are either rotatably fixed for common rotation with the second countershaft 30 or are selectively connectable for common rotation with the second countershaft 30. Further, gears 74, 84 and 94 are either rotatably fixed for common rotation with the first countershaft 28 or are selectively connectable for common rotation with the first countershaft 28. The individual gears of co-planar gear sets 40, 50, 60, 70, 80 and 90 are independently and selectively connectable for common rotation with the first transmission input shaft 22, second transmission input shaft member 24, first countershaft 28 or second countershaft 30 by synchronizer assemblies, as will be further described hereinafter. Of course, the present invention contemplates other selectively actuatable devices other than synchronizers for connecting gears to shafts.

Figure 2:
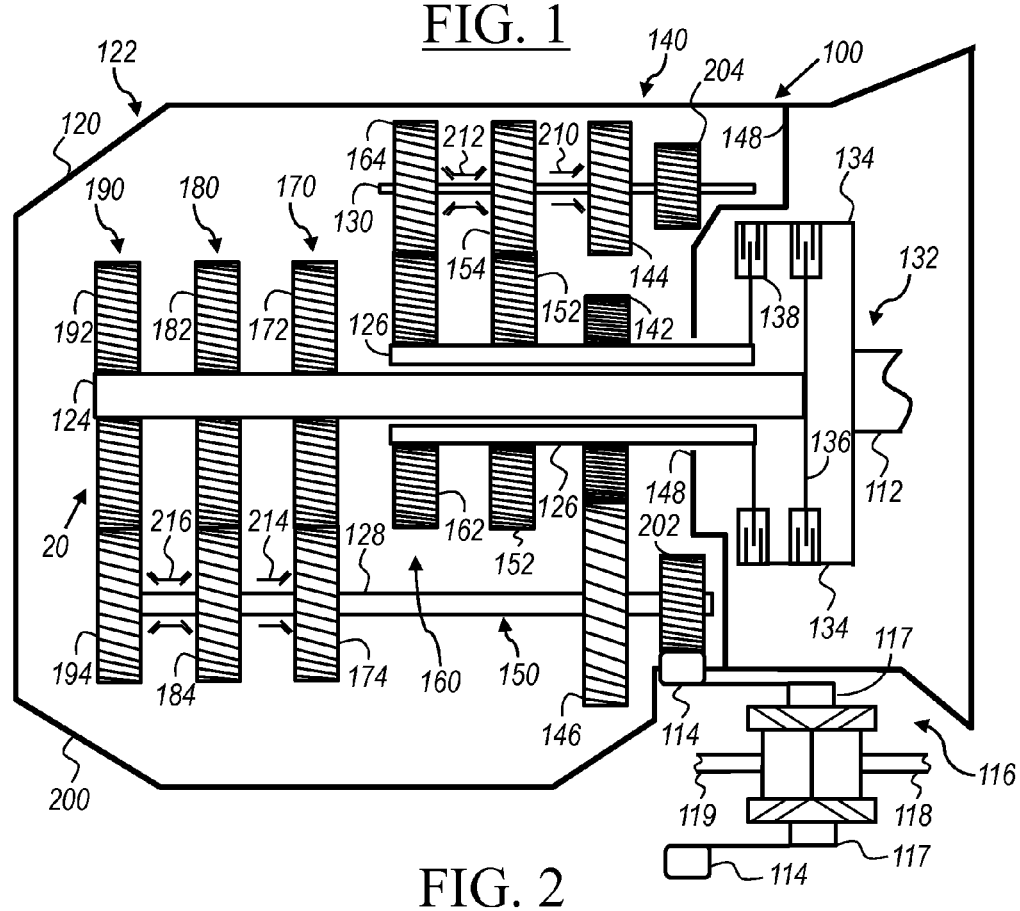
FIG. 2 is a schematic diagram of an embodiment of a five speed transmission illustrating the locations of four synchronizers on the countershafts, in accordance with the present invention.

Referring now to FIG. 2, another embodiment of a multiple speed transmission is generally indicated by reference number 100. The transmission 100 is connectable to an input shaft or member 112 and includes an output gear or member 114. The input member 112 is continuously connected with an engine (not shown) or other torque producing machine to provide a driving torque to input member 112. The output member 114 rotatably drives a final drive assembly 116. More specifically, the final drive assembly 116 includes a differential gear set coupled to and supported in a differential housing 117. Differential housing 117 is coupled to and is rotatably driven by output member 114. Further, differential housing 117 transfers torque delivered by output member 114 to the differential gear set that is rotatably coupled to first and second side axles 118, 119, and on to road wheels (not shown) coupled to side axles 118, 119.

The transmission 100 includes a housing 120 that at least partially encloses a gearing arrangement 122. As in the embodiment described above, the gearing arrangement 122 of transmission 100 includes a first transmission input shaft or member 124, a second transmission input shaft or member 126, a first countershaft 128 and a second countershaft 130. The second transmission input shaft or member 126 is a sleeve shaft that is concentric with and overlies the first transmission input shaft or member 124. The first and second countershafts 128, 130 are each spaced apart from and parallel with the first and second transmission input shaft or members 124,126. The first and second shafts 124,126 define a first axis of rotation, the first countershaft 128 defines a second axis of rotation and the second countershaft 130 defines a third axis of rotation.

A dual clutch assembly 132 is connectable between the input member 112 and the first and second transmission input shaft members 124, 126. The dual clutch assembly 132 includes a clutch housing 134 connectable to the input member 112 for common rotation with the input member 112. Further, the dual clutch assembly 132 has first and second clutch elements or hubs 136 and 138. Clutch elements 136 and 138 together with the clutch housing 134 are configured to form a friction clutch, as is known in the art as a dual clutch. More specifically, clutch elements 136, 138 and the clutch housing 134 have friction plates mounted thereon or otherwise coupled thereto that interact to form a friction clutch. The clutch element 136 is connected for common rotation with the first transmission input shaft or member 124 and the clutch element 138 is connected for common rotation with the second transmission input shaft or member 126. Thus, selective engagement of clutch element 136 with the clutch housing 134 connects the input member 112 for common rotation with the first shaft member 124. Selective engagement of clutch element 138 with the clutch housing 134 connects the input member 112 for common rotation with the second transmission input shaft member 126.

The gearing arrangement 122 also includes a plurality of co-planar, intermeshing gear sets 140, 150, 160, 170, 180 and 190. Co-planar gear set 140 includes gear 142, gear 144 and gear 146. Gear 142 is rotatably fixed and connected for common rotation with the second shaft 126. Gear 144 is selectively connectable for common rotation with the second countershaft member 130 and intermeshes with gear 146. Gear 146 is supported by and free to rotate on and independent of the first countershaft 128 and intermeshes with gear 142 and gear 144. It should be appreciated that gear 142 may be a separate gear structure fixed to the second shaft member 126 or gear teeth/splines formed on an outer surface of the second shaft member 126 without departing from the scope of the present invention. Gear set 140 is disposed adjacent a wall 148 of the transmission housing 120 that is on a front or side of the transmission 100 proximate the dual clutch assembly 132.

Co-planar gear set 150 includes gear 152 and gear 154. Gear 152 is rotatably fixed and connected for common rotation with the second shaft member 126 and intermeshes with gear 154. Gear 154 is selectively connectable for common rotation with the second countershaft 130. Gear set 150 is positioned adjacent gear set 140.

Co-planar gear set 160 includes gear 162 and gear 164. Gear 162 is rotatably fixed and connected for common rotation with the second shaft member 126 and intermeshes with gear 164. Gear 164 is selectively connectable for common rotation with the second countershaft 130. Gear set 160 is disposed adjacent gear set 150.

Co-planar gear set 170 includes gear 172 and gear 174. Gear 172 is rotatably fixed and connected for common rotation with the first shaft 124 and intermeshes with gear 174. Gear 174 is selectively connectable for common rotation with the first countershaft member 128. Gear set 170 is located adjacent gear set 160.

Co-planar gear set 180 includes gear 182 and gear 184. Gear 182 is rotatably fixed and connected for common rotation with the first shaft member 124 and intermeshes with gear 184. Gear 184 is selectively connectable for common rotation with the first countershaft 128. Gear set 180 is positioned adjacent gear set 170.

Co-planar gear set 190 includes gear 192 and gear 194. Gear 192 is rotatably fixed and connected for common rotation with the first shaft member 124 and intermeshes with gear 194. Gear 194 is selectively connectable for common rotation with the first countershaft 128. Gear set 190 is positioned between gear set 180 and an end wall 200 of transmission 100.

It should be noted that gear sets 140, 150, 160, 170, 180 and 190 can be rearranged in sequence and not deviate from the intent of the invention.

Further, a first countershaft transfer gear 202 is rotatably fixed and connected for common rotation with the first countershaft member 128. A second countershaft transfer gear 204 is rotatably fixed and connected for common rotation with the second countershaft member 130. First countershaft transfer gear 202 is configured to mesh with output member 114 and the second countershaft transfer gear 204 is configured to mesh with output member 114. However, the first countershaft transfer gear 202 and the second countershaft transfer gear 204 do not mesh with each other. The first countershaft transfer gear 202 is disposed between gear 146 and end wall 148 of the transmission housing 120. The second countershaft transfer gear 204 is disposed between gear 144 and end wall 148 of the transmission housing 120. The output member 114 is co-planar with first and second countershaft transfer gears 202, 204 and positioned between the gear set 140 and end wall 148 of the transmission housing 120.

The transmission 100 further includes a plurality of selectively actuatable synchronizer assemblies 210, 212, 214 and 216. Synchronizers 210 and 214 are single sided synchronizers that generally include a shift fork (not shown) that is bi-directionally translated by an actuator (not shown) into either an engaged position or a neutral or disengaged position. In the present embodiment, synchronizer 210 is selectively actuatable to connect gear 144 for common rotation with the second countershaft 130 and synchronizer 214 is selectively actuatable to connect gear 174 for common rotation with the first countershaft member 128. In a preferred embodiment, synchronizers 210, 214 have only one actuator.

Synchronizers 212 and 216 are double sided synchronizers and generally include a shift fork (not shown) that is bi-directionally translated by an actuator (not shown) into at least two engaged positions and a neutral or disengaged position. In the present embodiment, synchronizer 212 is selectively actuatable to connect for common rotation gear 154 with the second countershaft 130 and is selectively actuatable to connect for common rotation gear 164 with the second countershaft 130. Synchronizer 216 is selectively engageable to connect for common rotation gear 184 with the first countershaft 128 and is selectively engageable to connect for common rotation gear 194 with the first countershaft 128.

The transmission 100 is capable of transmitting torque from the input shaft 112 to the output member 114 in at least five forward torque ratios and at least one reverse torque ratio. Each of the forward torque ratios and the reverse torque ratio is attained by selective engagement of the dual clutch assembly 132 and one or more of the synchronizer assemblies 210, 212, 214 and 216. Those skilled in the art will readily understand that a different speed ratio is associated with each torque ratio.

It should be appreciated that each individual gear set 140, 150, 160, 170, 180 and 190 provides one or more forward and/or reverse gear ratios upon selective engagement of the synchronizer assemblies 210, 212, 214 and 216. However, which synchronizer and which gear set are associated with a particular forward or reverse speed ratio may vary without departing from the scope of the present invention.

For example, to establish the reverse torque ratio, clutch element 138 is engaged to couple the input member 112 with the second shaft 126 and synchronizer 210 is engaged to connect gear 144 to the second countershaft 130. More specifically, input torque from the input shaft 112 is transferred through the dual clutch assembly 132 to the second shaft 126, through gear 142 to gear 146, through gear 146 to gear 144, from gear 144 to synchronizer 210, from synchronizer 210 to second countershaft 130, from second countershaft 130 to transfer gear 204, from transfer gear 204 to output gear 114 and from output gear 114 to differential housing 117 of final drive assembly 116.

To establish a first forward torque ratio (i.e. a 1st gear), clutch element 136 is engaged to couple the input member 112 with the first shaft member 124 and synchronizer 216 is activated to couple gear 194 to the first countershaft 128. Input torque from the input member 112 is transferred through the dual clutch assembly 132 to the first shaft member 124 to gear 192. Gear 192 transfers torque to gear 194 which transfers the torque to the first countershaft 128 through synchronizer 216 and from the first countershaft 128 to transfer gear 202 and from transfer gear 202 to output gear 114 and from output gear 114 to differential housing 117 of final drive assembly 116.

To establish a second forward torque ratio (i.e. a 2nd gear), clutch element 138 is engaged to couple the input member 112 to the second shaft 126 which rotates gear 152 and synchronizer 212 is activated to couple gear 154 to the second countershaft member 130. Accordingly, input torque from the input member 112 is transferred through the dual clutch assembly 132 to the second shaft member 126 to gear 152. Gear 152 transfers torque to gear 154 which transfers the torque to the second countershaft 130 through synchronizer 212 and from the second countershaft 130 to transfer gear 204 and from transfer gear 204 to output gear 114 and from output gear 114 to differential housing 117 of final drive assembly 116.

To establish a third forward torque ratio (i.e. a 3rd gear), clutch element 136 is engaged to couple the input member 112 to the first shaft 124 which rotates gear 182 and synchronizer 216 is engaged to couple gear 184 to the first countershaft 128. Accordingly, input torque from the input member 112 is transferred through the dual clutch assembly 132 to the first shaft 124 to gear 182. Gear 182 transfers torque to gear 184 which transfers the torque to the first countershaft 128 through synchronizer 216 and from the first countershaft 128 to transfer gear 202 and from transfer gear 202 to output gear 114 and from output gear 114 to differential housing 117 of final drive assembly 116.

To establish a fourth forward torque ratio (i.e. a 4th gear), clutch element 138 is engaged to couple the input member 112 to the second shaft member 126 which rotates gear 162 and synchronizer 212 is activated to couple gear 164 to the second countershaft 130. Thus, input torque from the input member 112 is transferred through the dual clutch assembly 132 to the second shaft 126 to gear 162. Gear 162 transfers torque to gear 164 which transfers the torque to the second countershaft 130 through synchronizer 212 and from the second countershaft 130 to transfer gear 204 and from transfer gear 204 to output gear 114 and from output gear 114 to differential housing 117 of final drive assembly 116.

To establish a fifth forward torque ratio (i.e. a 5th gear), clutch element 136 is engaged to couple the input member 112 to the first shaft 124 which rotates gear 172 and synchronizer 214 is activated to couple gear 174 to the first countershaft 128. Thus, input torque from the input member 112 is transferred through the dual clutch assembly 132 to the first shaft 124 to gear 172. Gear 172 transfers torque to gear 174 which transfers the torque to the first countershaft 128 through synchronizer 214 and from the first countershaft 128 to transfer gear 202 and from transfer gear 202 to output gear 114 and from output gear 114 to differential housing 117 of final drive assembly 116.

Again, it should be appreciated that any one of the gear sets of gear sets 140, 150, 160, 170, 180 and 190 may be interchanged to produce a certain forward and reverse torque ratio without departing from the scope of the present invention.

The present invention contemplates that a variety of torque ratios (i.e., the ratio of torque of the output member 114 to the input member 112) are achievable through the selection of tooth counts of the gears of the transmission 100. This arrangement provides the opportunity to achieve reduced transmission length in comparison with other transmissions.

Figure 3:
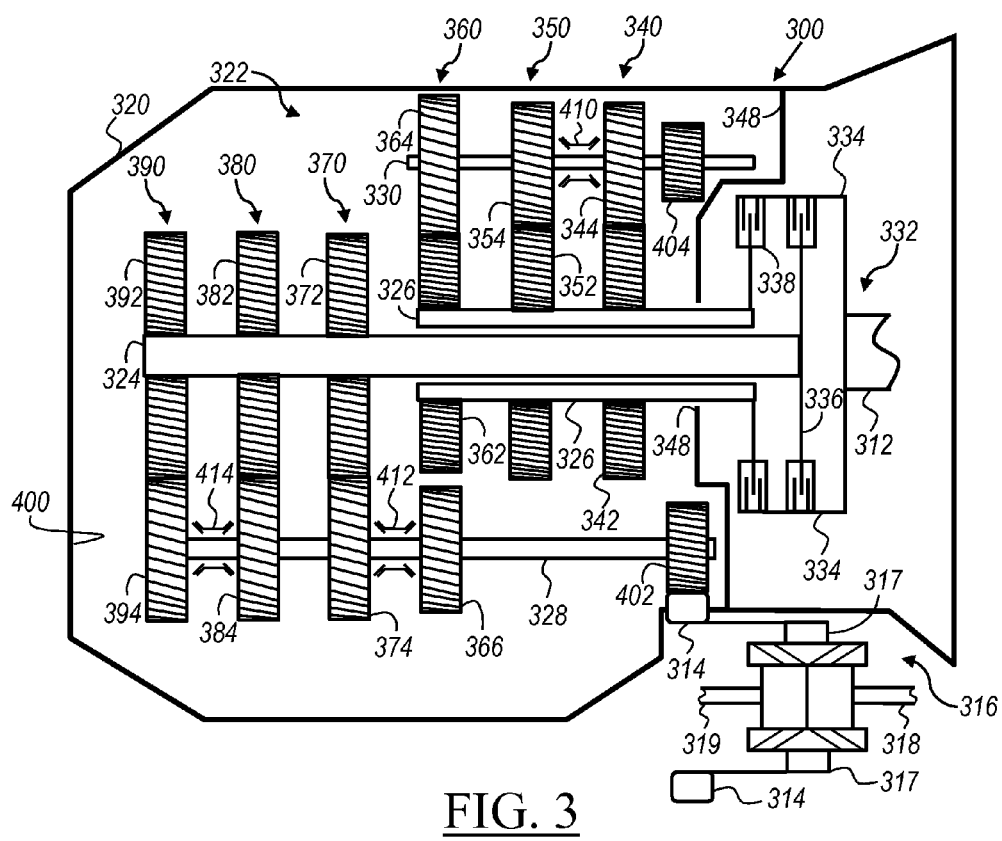
FIG. 3 is a schematic diagram of another embodiment of a five speed transmission illustrating the locations of three synchronizers on the countershafts, in accordance with the present invention.

Referring now to FIG. 3, another embodiment of a multiple speed transmission is generally indicated by reference number 300. The transmission 300 is connectable to an input shaft or member 312 and transfers torque to an output gear or member 314. The input member 312 is continuously connected with an engine (not shown) or other torque producing machine to provide a driving torque to input member 312. The output member 314 rotatably drives a final drive assembly 316. More specifically, the final drive assembly 316 includes a differential gear set coupled to and supported in a differential housing 317. Differential housing 317 is coupled to and is rotatably driven by output member 314. Further, differential housing 317 transfers torque delivered by output member 314 to the differential gear set that is rotatably coupled to first and second drive axles 318, 319, and on to road wheels (not shown) coupled to drive axles 318, 319.

The transmission 300 includes a housing 320 that at least partially encloses a gearing arrangement 322. As in the embodiment described above, the gearing arrangement 322 of transmission 300 includes a first transmission input shaft or member 324, a second transmission input shaft or member 326, a first countershaft 328 and a second countershaft 330. The second transmission input shaft or member 326 is a sleeve shaft that is concentric with and overlies the first transmission input shaft or member 324. The first and second countershafts 328, 330 are each spaced apart from and parallel with the first and second transmission input shaft or members 324, 326. The first and second shafts 324, 326 define a first axis of rotation, the first countershaft 328 defines a second axis of rotation and the second countershaft 330 defines a third axis of rotation.

A dual clutch assembly 332 is connectable between the input member 312 and the first and second transmission input shaft members 324, 326. The dual clutch assembly 332 includes a clutch housing 334 connectable to the input member 312 for common rotation with the input member 312. Further, the dual clutch assembly 332 has first and second clutch elements or hubs 336 and 338. Clutch elements 336 and 338 together with the clutch housing 334 are configured to form a friction clutch, as is known in the art as a dual clutch. More specifically, clutch elements 336, 338 and the clutch housing 334 have friction plates or elements mounted thereon or otherwise coupled thereto that interact to form a friction clutch. The clutch element 336 is connected for common rotation with the first transmission input shaft or member 324 and the clutch element 338 is connected for common rotation with the second transmission input shaft or member 326. Thus, selective engagement of clutch element 336 with the clutch housing 334 connects the input member 312 for common rotation with the first shaft member 324. Selective engagement of clutch element 338 with the clutch housing 334 connects the input member 312 for common rotation with the second transmission input shaft member 326.

The gearing arrangement 322 also includes a plurality of co-planar, intermeshing gear sets 340, 350, 360, 370, 380 and 390.

Co-planar gear set 340 includes gear 342 and gear 344. Gear 342 is rotatably fixed and connected for common rotation with the second transmission input shaft 326 and intermeshes with gear 344. Gear 344 is selectively connectable for common rotation with the second countershaft 330. Gear set 340 is disposed adjacent a wall 348 of the transmission housing 320 that is on a front or side of the transmission 300 proximate the dual clutch assembly 332.

Co-planar gear set 350 includes gear 352 and gear 354. Gear 352 is rotatably fixed and connected for common rotation with the second transmission input shaft 326 and intermeshes with gear 354. Gear 354 is selectively connectable for common rotation with the second countershaft 330. Gear set 350 is positioned adjacent gear set 340.

Co-planar gear set 360 includes gear 362, gear 364 and gear 366. Gear 362 is rotatably fixed and connected for common rotation with the second transmission input shaft 326. Gear 364 is supported by and free to rotate on and independent of the second countershaft 330 and intermeshes with gear gear 366 and gear 362. Gear 366 is selectively connectable for common rotation with the first countershaft member 328 and intermeshes with gear 364. It should be appreciated that gear 362 may be a separate gear structure fixed to the second transmission input shaft 326 or gear teeth/splines formed on an outer surface of the second transmission input shaft 326 without departing from the scope of the present invention. Gear set 360 is disposed adjacent gear set 350.

Co-planar gear set 370 includes gear 372 and gear 374. Gear 372 is rotatably fixed and connected for common rotation with the first transmission input shaft 324 and intermeshes with gear 374. Gear 374 is selectively connectable for common rotation with the first countershaft member 328. Gear set 370 is located adjacent gear set 360.

Co-planar gear set 380 includes gear 382 and gear 384. Gear 382 is rotatably fixed and connected for common rotation with the first transmission input shaft 324 and intermeshes with gear 384. Gear 384 is selectively connectable for common rotation with the first countershaft 328. Gear set 380 is positioned adjacent gear set 370.

Co-planar gear set 390 includes gear 392 and gear 394. Gear 392 is rotatably fixed and connected for common rotation with the first transmission input shaft 324 and intermeshes with gear 394. Gear 394 is selectively connectable for common rotation with the first countershaft 328. Gear set 390 is positioned between gear set 380 and an end wall 400 of transmission 300.

It should be noted that gear sets 340, 350, 360, 370, 380 and 390 can be rearranged in sequence and not deviate from the intent of the invention.

Further, a first countershaft transfer gear 402 is rotatably fixed and connected for common rotation with the first countershaft member 328. A second countershaft transfer gear 404 is rotatably fixed and connected for common rotation with the second countershaft member 330. First countershaft transfer gear 402 is configured to mesh with output member 314 and the second countershaft transfer gear 404 is configured to mesh with output member 314. However, the first countershaft transfer gear 402 and the second countershaft transfer gear 404 do not mesh with each other. The first countershaft transfer gear 402 is disposed between gear 366 and end wall 348 of the transmission housing 320. The second countershaft transfer gear 404 is disposed between gear 344 and end wall 348 of the transmission housing 320. The output member 314 is co-planar with first and second countershaft transfer gears 402, 404 and positioned between the gear set 340 and end wall 348 of the transmission housing 320.

The transmission 300 further includes a plurality of selectively actuatable synchronizer assemblies 410, 412 and 414. Synchronizers 410, 412 and 414 are double sided synchronizers and generally include a shift fork (not shown) that is bi-directionally translated by an actuator (not shown) into at least two engaged positions and a neutral or disengaged position. In the present embodiment, synchronizer 410 is selectively actuatable to connect for common rotation gear 344 with the second countershaft 330 and is selectively actuatable to connect for common rotation gear 354 with the second countershaft 330. Synchronizer 412 is selectively engageable to connect for common rotation gear 366 with the first countershaft 328 and is selectively engageable to connect for common rotation gear 374 with the first countershaft 328. Synchronizer 414 is selectively engageable to connect for common rotation gear 384 with the first countershaft 328 and is selectively engageable to connect for common rotation gear 394 with the first countershaft 328.

The transmission 300 is capable of transmitting torque from the input shaft 312 to the output member 314 in at least five forward torque ratios and at least one reverse torque ratio. Each of the forward torque ratios and the reverse torque ratio is attained by selective engagement of the dual clutch assembly 332 and one or more of the synchronizer assemblies 410, 412 and 414. Those skilled in the art will readily understand that a different speed ratio is associated with each torque ratio.

It should be appreciated that each individual gear set 340, 350, 360, 370, 380 and 390 provides one or more forward and/or reverse gear ratios upon selective engagement of the synchronizer assemblies 410, 412 and 414. However, which synchronizer and which gear set are associated with a particular forward or reverse speed ratio may vary without departing from the scope of the present invention.

For example, to establish the reverse torque ratio, clutch element 338 is engaged to couple the input member 312 with the second transmission input shaft 326 and synchronizer 412 is engaged to connect gear 366 to the first countershaft 328. More specifically, input torque from the input shaft 312 is transferred through the dual clutch assembly 332 to the second transmission input shaft 326, from the second transmission input shaft 326 to gear 362, through gear 362 to gear 364, through gear 364 to gear 366, from gear 366 to synchronizer 412, from synchronizer 412 to first countershaft 328, from first countershaft 328 to transfer gear 402, from transfer gear 402 to output gear 314 and from output gear 314 to differential housing 317 of final drive assembly 316.

To establish a first forward torque ratio (i.e. a 1st gear), clutch element 336 is engaged to couple the input member 312 with the first shaft member 324 and synchronizer 414 is activated to couple gear 394 to the first countershaft 328. Input torque from the input member 312 is transferred through the dual clutch assembly 332 to the first transmission input shaft 324 to gear 392. Gear 392 transfers torque to gear 394 which transfers the torque to the first countershaft 328 through synchronizer 414 and from the first countershaft 328 to transfer gear 402 and from transfer gear 402 to output gear 314 and from output gear 314 to differential housing 317 of final drive assembly 316.

To establish a second forward torque ratio (i.e. a 2nd gear), clutch element 338 is engaged to couple the input member 312 to the second transmission input shaft 326 which rotates gear 352 and synchronizer 410 is activated to couple gear 354 to the second countershaft member 330. Accordingly, input torque from the input member 312 is transferred through the dual clutch assembly 332 to the second shaft member 326 to gear 352. Gear 352 transfers torque to gear 354 which transfers the torque to the second countershaft 330 through synchronizer 410 and from the second countershaft 330 to transfer gear 404 and from transfer gear 404 to output gear 314 and from output gear 314 to differential housing 317 of final drive assembly 316.

To establish a third forward torque ratio (i.e. a 3rd gear), clutch element 336 is engaged to couple the input member 312 to the first shaft 324 which rotates gear 372 and synchronizer 412 is engaged to couple gear 374 to the first countershaft 328. Accordingly, input torque from the input member 312 is transferred through the dual clutch assembly 332 to the first transmission input shaft 324 to gear 372. Gear 372 transfers torque to gear 374 which transfers the torque to the first countershaft 328 through synchronizer 412 and from the first countershaft 328 to transfer gear 402 and from transfer gear 402 to output gear 314 and from output gear 314 to differential housing 317 of final drive assembly 316.

To establish a fourth forward torque ratio (i.e. a 4th gear), clutch element 338 is engaged to couple the input member 312 to the second shaft member 326 which rotates gear 342 and synchronizer 410 is activated to couple gear 342 to the second countershaft 330. Thus, input torque from the input member 312 is transferred through the dual clutch assembly 332 to the second shaft 326 to gear 342. Gear 342 transfers torque to gear 344 which transfers the torque to the second countershaft 330 through synchronizer 410 and from the second countershaft 330 to transfer gear 404 and from transfer gear 404 to output gear 314 and from output gear 314 to differential housing 317 of final drive assembly 316.

To establish a fifth forward torque ratio (i.e. a 5th gear), clutch element 336 is engaged to couple the input member 312 to the first transmission input shaft 324 which rotates gear 382 and synchronizer 414 is activated to couple gear 384 to the first countershaft 328. Thus, input torque from the input member 312 is transferred through the dual clutch assembly 332 to the first transmission input shaft 324 to gear 382. Gear 382 transfers torque to gear 384 which transfers the torque to the first countershaft 328 through synchronizer 414 and from the first countershaft 328 to transfer gear 402 and from transfer gear 402 to output gear 314 and from output gear 314 to differential housing 317 of final drive assembly 316.

Again, it should be appreciated that any one of the gear sets of gear sets 340, 350, 360, 370, 380 and 390 may be interchanged to produce a certain forward and reverse torque ratio without departing from the scope of the present invention.

The present invention contemplates that a variety of torque ratios (i.e., the ratio of torque of the output member 314 to the input member 312) are achievable through the selection of tooth counts of the gears of the transmission 300. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a transmission housing;
a dual clutch assembly having a clutch housing connectable to a flywheel of an engine, wherein the clutch housing is rotationally supported within the transmission housing;
a first, second, third, fourth, fifth and sixth gear sets, wherein the first gear set includes a first gear in mesh with a second gear, the second gear set includes a first gear in mesh with a second gear, the third gear set includes a first gear in mesh with a third gear and a second gear in mesh with the third gear, the fourth gear set includes a first gear in mesh with a second gear, the fifth gear set includes a first gear in mesh with a second gear and the sixth gear set includes a first gear in mesh with a second gear;
a first transmission input member rotatably supported in the transmission housing and wherein each of the first gears of the fourth, fifth and sixth gear sets are rotatably fixed for common rotation with the first transmission input member;
a second transmission input member rotatably supported in the transmission housing, wherein each of the first gears of the first, second and third gear sets are rotatably fixed for common rotation with the second transmission input member and wherein the second transmission input member is concentric with the first transmission input member and at least partially surrounds the first transmission input member;
a first countershaft rotatably supported within the transmission housing and spaced apart from and parallel with the first and second transmission input members, wherein the second gear of the third gear set and the second gears of the fourth gear set, the fifth gear set and the sixth gear set are each selectively connectable for common rotation with the first countershaft;
a second countershaft rotatably supported within the transmission housing and spaced apart from and parallel with the first and second transmission input members, wherein the second gears of the first gear set and the second gear set are each selectively connectable for common rotation with the second countershaft and wherein the third gear of the third gear set is supported on and rotatable about the second countershaft;
three synchronizer assemblies for selectively coupling at least one of the gears of the first, second, third, fourth, fifth and sixth gear sets with at least one of the first countershaft and the second countershaft, and
wherein the selective engagement of dual clutch assembly interconnects the dual clutch housing with at least one of the first and the second transmission input members and the selective engagement of at least one of the three synchronizer assemblies establishes at least one of five forward speed ratios.

2. The transmission of claim 1 wherein a first of the three synchronizer assemblies selectively connects the second gear of the first gear set and the second gear of the second gear set to the second countershaft.

3. The transmission of claim 2 wherein a second of the three synchronizer assemblies selectively connects the second gear of the third gear set and second gear of the fourth gear set to the first countershaft.

4. The transmission of claim 3 wherein a third of the three synchronizer assemblies selectively connects the second gear of the fifth gear set and the second gear of the sixth gear set to the first countershaft.

5. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set and the sixth gear set is between an end wall of the transmission housing and the fifth gear set.

6. The transmission of claim 1 wherein the dual clutch assembly includes a first clutch and a second clutch, wherein the second clutch is configured to selectively connect the clutch housing to the second transmission input member and wherein at least one of the three synchronizer assemblies selectively connects the second gear of the third gear set to the first countershaft to establish a reverse gear ratio.

7. The transmission of claim 1 wherein the first clutch of the dual clutch assembly is configured to selectively connect the clutch housing to the first transmission input member and wherein the third synchronizer of the three synchronizer assemblies is configured to selectively connect the second gear of the sixth gear set to the first countershaft to establish a first gear ratio.

8. The transmission of claim 1 wherein the second clutch of the dual clutch assembly is configured to selectively connect the clutch housing to the second transmission input member and wherein the first synchronizer assembly of the three synchronizer assemblies is configured to selectively connect the second gear of the second gear set to the second countershaft to establish a second gear ratio.

9. The transmission of claim 1 wherein the first clutch of the dual clutch is configured to selectively connect the clutch housing to the first transmission input member and wherein a second synchronizer assembly of the three synchronizer assemblies is configured to selectively connect the second gear of the fourth gear set to the first countershaft to establish a third gear ratio.

10. The transmission of claim 1 wherein the second clutch of the dual clutch is configured to selectively connect the clutch housing to the second transmission input member and wherein the first synchronizer assembly of the three synchronizer assemblies is configured to selectively connect the second gear of the first gear set to the second countershaft to establish a fourth gear ratio.

11. The transmission of claim 1 wherein the first clutch of the dual clutch is configured to selectively connect the clutch housing to the first transmission input member and wherein the third synchronizer assembly of the three synchronizer assemblies is configured to selectively connect the second gear of the fifth gear set to the first countershaft to establish a fifth gear ratio.

12. The transmission of claim 1 further comprising a first countershaft transfer gear fixed to the first countershaft for common rotation with the first countershaft and a second countershaft transfer gear fixed to the second countershaft for common rotation with the second countershaft and wherein the first and second countershaft transfer gears transfer torque from at least one of the first and second countershafts to an output member.

13. The transmission of claim 12 wherein the output member is a gear that meshes with the each of the first and second countershaft transfer gears.

14. A dual clutch transmission comprising:
a transmission housing;
a first, second, third, fourth, fifth and sixth gear sets, wherein the first gear set includes a first gear in mesh with a second gear, the second gear set includes a first gear in mesh with a second gear, the third gear set includes a first gear in mesh with a third gear and a second gear in mesh with the third gear, the fourth gear set includes a first gear in mesh with a second gear, the fifth gear set includes a first gear in mesh with a second gear and the sixth gear set includes a first gear in mesh with a second gear;
a first transmission input member rotatably supported in the transmission housing and wherein each of the first gears of the fourth, fifth and sixth gear sets are rotatably fixed for common rotation with the first transmission input member;
a second transmission input member rotatably supported in the transmission housing, wherein each of the first gears of the first, second and third gear sets are rotatably fixed for common rotation with the second transmission input member and wherein the second transmission input member is concentric with the first transmission input member and at least partially surrounds the first transmission input member;
a dual clutch assembly having a clutch housing connectable to a flywheel of an engine, a first clutch configured to selectively connect the clutch housing to the first transmission input member and a second clutch configured to selectively connect the clutch housing to the second transmission input member and wherein the clutch housing is rotationally supported within the transmission housing;
a first countershaft rotatably supported within the transmission housing and spaced apart from and parallel with the first and second transmission input members, wherein the second gear of the third gear set and the second gears of the fourth gear set, the fifth gear set and the sixth gear set are each selectively connectable for common rotation with the first countershaft;
a second countershaft rotatably supported within the transmission housing and spaced apart from and parallel with the first and second transmission input members, wherein the second gears of the first gear set and the second gear set are each selectively connectable for common rotation with the second countershaft and wherein the third gear of the third gear set is supported on and rotatable about the second countershaft;
a first synchronizer assembly configured to selectively connect the second gear of the first gear set to the second countershaft to establish a fourth gear ratio and the second gear of the second gear set to the second countershaft to establish a second gear ratio when the second clutch of the dual clutch assembly is engaged to connect the clutch housing of the dual clutch to the second transmission input member;
a second synchronizer configured to selectively connect the second gear of the third gear set to the first countershaft to establish a reverse gear ratio when the second clutch of the dual clutch assembly is engaged to connect the clutch housing of the dual clutch to the second transmission input member and second gear of the fourth gear set to the first countershaft to establish a third gear ratio when the first clutch of the dual clutch assembly is engaged to connect the clutch housing of the dual clutch to the first transmission input member; and
a third synchronizer assembly configured to selectively connect the second gear of the fifth gear set to the first countershaft to establish a fifth gear ratio and the second gear of the sixth gear set to the first countershaft to establish a first gear ratio when the first clutch of the dual clutch assembly is engaged to connect the clutch housing of the dual clutch to the first transmission input member.

* * * * *